United States Patent [19]

Wisspeintner et al.

[11] Patent Number: 5,485,082
[45] Date of Patent: Jan. 16, 1996

[54] METHOD OF CALIBRATING A THICKNESS MEASURING DEVICE AND DEVICE FOR MEASURING OR MONITORING THE THICKNESS OF LAYERS, TAPES, FOILS, AND THE LIKE

[75] Inventors: Karl Wisspeintner; Roland Mandl, both of Ortenburg, Germany

[73] Assignee: Micro-Epsilon Messtechnik GmbH & Co. KG, Ortenburg, Germany

[21] Appl. No.: 934,526

[22] PCT Filed: Apr. 5, 1990

[86] PCT No.: PCT/DE91/00292

§ 371 Date: Dec. 10, 1992

§ 102(e) Date: Dec. 10, 1992

[87] PCT Pub. No.: WO91/15733

PCT Pub. Date: Oct. 17, 1991

[30] Foreign Application Priority Data

Apr. 11, 1990 [DE] Germany ................. 40 11 717.0

[51] Int. Cl.[6] .................... G01R 35/00; G01B 21/08; G01B 7/06; G01B 11/06
[52] U.S. Cl. ............... 324/202; 324/207.12; 324/225; 324/229; 324/230; 324/671; 356/381; 364/571.04
[58] Field of Search ............... 324/202, 207.12, 324/207.26, 225, 229–231, 601, 662, 671; 73/1 J; 356/381; 364/563, 571.02, 571.04; 250/560

[56] References Cited

U.S. PATENT DOCUMENTS

| | | | |
|---|---|---|---|
| 4,181,961 | 1/1980 | Nopper | 324/202 X |
| 4,276,480 | 6/1981 | Watson . | |
| 4,311,392 | 1/1982 | Yazaki et al. . | |
| 4,695,797 | 9/1987 | Deutsch et al. | 324/202 X |
| 4,757,259 | 7/1988 | Charpentier | 324/229 X |
| 4,771,237 | 9/1988 | Daley | 324/202 |
| 5,001,356 | 3/1991 | Ichikawa | 324/230 X |
| 5,062,298 | 11/1991 | Falcoff et al. | 324/230 X |

FOREIGN PATENT DOCUMENTS

| | | |
|---|---|---|
| 3324701 | 2/1984 | Germany . |
| 60-57203 | 4/1985 | Japan . |
| 62-255806 | 11/1987 | Japan . |
| 1-143908 | 6/1989 | Japan . |

*Primary Examiner*—Gerard R. Strecker
*Attorney, Agent, or Firm*—Bell, Seltzer, Park & Gibson

[57] ABSTRACT

A method of calibrating a thickness measuring device having preferably two noncontacting or scanning displacement measuring sensors (2, 3), which allows to calibrate in a simple manner, at the location of measurement, thickness measuring devices operating by different measuring principles by means of a reference object (7).

12 Claims, 2 Drawing Sheets

METHOD OF CALIBRATING A THICKNESS MEASURING DEVICE AND DEVICE FOR MEASURING OR MONITORING THE THICKNESS OF LAYERS, TAPES, FOILS, AND THE LIKE

BACKGROUND OF THE INVENTION

The present invention relates to a method of calibrating a thickness measuring device. The present invention relates in particular to a method of calibrating a thickness measuring device with two noncontacting or scanning displacement measuring sensors.

Furthermore, the present invention relates to a device for measuring or monitoring the thickness of layers, tapes, foils, and the like, having at least two noncontacting or scanning displacement measuring sensors arranged side by side or opposite to one another, in particular for carrying out the method of the invention.

Thickness measuring devices in the most different designs are known from practice, and operate either by the noncontacting or scanning method.

When measuring or monitoring the thickness of tapes, the advancing tapes are normally measured in their thickness by two oppositely arranged displacement measuring sensors. In so doing, and as illustrated in FIG. 1, the thickness D is determined from the distances A, B which the sensors have relative to the tape to be monitored, and from the distance C of the displacement measuring sensors relative to one another. The computing operation to determine the tape thickness D is:

$$D=C-(A+B).$$

Depending on the material and speed of the tape, the environment, and required accuracy, different measuring principles are to be applied when measuring a thickness, i.e., displacement measuring sensors operating by different measuring principles.

When it comes to monitor metal tapes with respect to their thickness, it is possible to use, at a low tape speed and with an unsensitive tape surface, inductive measuring scanners with a rolling or sliding tracer tip. With a sensitive tape surface, and/or at a high speed of the tape, and/or an action of force upon the tape which is to be avoided, noncontacting thickness measuring devices with eddy-current sensors, capacitive or optical sensors are used, which do not cause wear on the tape.

However, when nonmetallic tapes are to be monitored as regards their thickness, the thickness measuring device will then operate with inductive measuring scanners, when the tape is transported at a low speed, or when it has an unsensitive surface. In the case of a sensitive tape surface, soft tape material, clean environment, high tape speed, and undesired action of force on the tape, the measuring is mostly noncontacting with capacitive or optical sensors. Within the scope of noncontacting distance measuring, it is also possible to use an eddy-current sensor floating at a constant distance above the tape.

Naturally, the foregoing description also applies to the thickness measurement on foils, and to measurements of layer thicknesses of insulating and conducting materials.

However, the displacement measuring sensors used in the known thickness measuring devices are problematic in practice, since they exhibit a nonlinear behavior within their measuring range. As a result of a fluttering of the tapes to be monitored, the different thicknesses of the tape, or the movement of the tape toward or away from the displacement measuring sensors, the latter measure different distances. These different distances are subjected to errors in accordance with the nonlinear behavior of the displacement measuring sensors over the measuring range, so that finally the thickness resulting from the above discussed equation, i.e. from the individual distances measured by the displacement measuring sensors, is likewise subjected to errors.

Until now, it has been attempted to determine the nonlinearity of the individual displacement measuring sensors by "traversing" the entire measuring range of each displacement measuring sensor by means of an object guided by a micrometer screw, and to thus calibrate the displacement measuring sensors. Such a calibration is done, because of the apparatus situation, either in the lab of the instrument manufacturer or at the location by the expert personnel of the instrument manufacturer. Measuring errors caused at the measuring location by temperature fluctuations or thermal displacements, long-term drifts of the displacement measuring sensors, or the like are not considered in conventional thickness measuring devices. Rather, a costly subsequent calibration of the known thickness measuring device is required which, in consideration of the environment, must be carried out by the service personnel of the instrument manufacturer at the location, or under simulated environmental conditions in the lab of the manufacturer.

SUMMARY OF THE INVENTION

It is therefore the object of the invention to specify a method of calibrating a thickness measuring device, which allows to calibrate a thickness measuring device as often as is desired and in a simple manner at the location of the measurement. It is further the object to describe a thickness measuring device which allows an automatic calibration at the location of the measurement.

The method of the invention, which solves the above described problem, involves the calibration of a thickness measuring device with preferably two noncontacting or scanning displacement measuring sensors. More particularly, the following procedural steps are carried out: A reference object with a predetermined thickness is arranged in the measuring field of the displacement measuring sensors of the thickness measuring device. Subsequently, the reference object is moved within the measuring field of the displacement measuring sensors. In so doing, the distance is measured between the displacement measuring sensors and the reference object in as many relative positions of the reference object as are desired. For each relative position, the deviation of the values measured by the sensors from the predetermined thickness of the reference object, which results from the nonlinearity of the displacement measuring sensors, is stored as measuring error associated to the respective value measured by the sensor, so that the nonlinearities of the sensors can be compensated in the thickness measurement.

In accordance with the invention, it has been recognized that it is possible to compensate in a simple manner at the location for the nonlinearity of the thickness measuring device or the displacement measuring sensors used therein. A reference object having a known thickness and approximately corresponding, as regards its thickness, to an object which is to be monitored or measured later, "traverses" the measuring range of the displacement measuring sensors, so that in each position of the reference object relative to the displacement measuring sensors, the deviation of the measured values from the actual distance from the reference object or from the known thickness is determined as a measuring error caused by the nonlinearity of the displacement measuring sensors. This measuring error is stored as a measuring error associated to the respective value measured by the sensor, so that when measuring the thickness, it is possible to compensate the nonlinearities of the displacement measuring sensors in that the respectively measured values are corrected by means of the determined measuring errors by addition or subtraction.

In accordance with the specific embodiments of the present invention as described herein it becomes possible to further develop the method of the invention in an advantageous manner in that the movement of the reference object in the range of the displacement measuring sensors occurs by mechanically deflecting the reference object, preferably by means of a push rod, and that the reference object is thereby moved toward or away from the displacement measuring sensors. In this instance, the reference object is deflected via a device specially provided therefor. When the sensors are arranged facing one another (see FIG. 1), this means that the reference object is moved between the sensors. The reference object is thereby moved in the measuring range of the sensors, so that it is possible to determine in each position of the reference object relative to the sensors, the deviation from the actual thickness of the reference object, i.e. the measuring error of the thickness measuring device.

Likewise, it is possible to achieve the movement of the reference object in the measuring range of the displacement measuring sensors by deflecting the reference object by means of a magnet. The reference object is thereby moved likewise toward or away from the displacement measuring sensors. In this instance, it is necessary that either the reference object itself or a holder for the reference object can be magnetically influenced. In a particular advantageous manner, it would also be possible to deflect the reference object pneumatically, or by water sprayed on the surface of the reference object.

In a particular advantageous manner, the reference object is moved parallel to the active surfaces of the displacement measuring sensors in their measuring field, i.e. in the direction of advance of an object to be measured later. Unevennesses of the reference object itself, a fluttering of the reference object as it moves, or deliberately provoked movements of the reference object orthogonally to its actual direction of advance effect the "traversing" of the measuring range of the displacement measuring sensors, so that, as a result, the measuring error associated to the respective positions of the reference object relative to the displacement measuring sensors can be determined in a particular advantageous manner.

Before the actual thickness measurement, the reference object could also be moved automatically into the measuring field of the displacement measuring sensors. To determine the measuring errors caused by the nonlinearity of the displacement measuring sensors, the reference object would then be moved, in accordance with the foregoing description, through the measuring field and likewise be moved again out of the measuring field.

Now, a thickness measuring device is to measure or monitor tapes, foils, or layers with different thicknesses. To limit the measuring range of the displacement measuring sensors, it is necessary to use when calibrating the thickness measuring device, reference objects which have approximately the thickness of the object to be respectively monitored. Consequently, depending on the thickness of the objects to be monitored, it is necessary to use differently thick reference objects for the calibration. In a universal thickness measuring device, the latter may in an advantageous manner be selected from a magazine containing several reference objects with different thicknesses. The arrangement of such a magazine with differently thick reference objects would furnish a contribution to a fully automatic layout of the thickness measuring device.

As regards a fully automatic thickness measuring device, it would be particularly advantageous, if the calibration of the thickness measuring device with selected reference objects occurred in predeterminable time intervals, so that the displacement measuring sensors are constantly adapted to environmental influences or long-term drifts. Such a thickness measuring device would then be fully independent of any subsequent calibration work whatsoever on the part of a manufacturer's personnel.

Likewise, it would be possible to use as reference object the tape or foil to be monitored with respect to its thickness. The desired value of the tape or foil to be monitored would have then to be input as reference value.

Since in stationary displacement measuring sensors, the distance of the one displacement measuring sensor from the reference object or the object to be monitored represents a linear function of the distance of the other displacement measuring sensor from the reference object or the object to be monitored, it will suffice to use for a compensation of the nonlinearities of the displacement measuring sensors only the measuring errors associated to the values measured by one of the displacement sensors.

When it comes to monitor tapes or foils, for which no reference objects with corresponding thicknesses are available, it is possible to linearly compute for unavailable intermediate quantities, the characteristics of the measuring errors which are determined from the measuring errors of available reference objects with predetermined thicknesses. Particularly suited therefor are known interpolation methods, for example, by means of a two-dimensional average filter which is known from image processing.

As regards the method of the invention, finally mention should be made that in an advantageous manner the deviation of the measured sensor values from the predetermined thickness of the reference object, which is obtained for each relative position of a reference object from the nonlinearity of the displacement measuring sensor, is stored as measuring errors associated to the measured sensor values in digital form in a memory specially provided therefor.

The thickness measuring device of the present invention, which solves the underlying problem, is defined by a device for measuring or monitoring the thickness of layers, tapes, foils, or the like, having at least two noncontacting or scanning displacement measuring sensors arranged side by side or opposite to one another, and which is provided with a means for automatically feeding a reference object into the measuring field of the displacement measuring sensors. Such a thickness measuring device allows the above described method of the invention to be carried out.

In a particularly advantageous manner, the means for automatically feeding reference objects of the thickness measuring device in accordance with the invention includes a transport means which advances the reference object in the measuring field of the displacement measuring sensors.

For a fully automatic calibration, a magazine with several reference objects of different thicknesses is provided. The automatic feed means selectively picks the reference objects contained in the magazine.

When layer thicknesses of insulating materials on an electrically conducting material are measured, the displacement measuring sensors are advantageously arranged side by side and opposite to the reference object or the object to be measured, with one displacement measuring sensor being capacitive, and the other operating by the eddy-current principle.

Furthermore, the thickness measuring device of the invention is provided with a data storage, so that it is possible to input therein as measuring errors associated to the measured sensor values in digital form, the deviations of the measured sensor values from the predetermined thickness of the reference object, which result for each relative position of a reference object from the nonlinearity of the displacement measuring sensors. The data storage is organized preferably two-dimensionally as a matrix memory. If one considers further the different thicknesses of different reference objects, the data storage will have to be set up three-dimensionally. The measuring errors can be linearized between the different thicknesses and the measuring errors associated to these thicknesses over the entire measuring range, thereby making it possible to compute "intermediate values" in a simple manner.

BRIEF DESCRIPTION OF THE DRAWINGS

Various further possibilities exist to configure and further develop the subject matter of the present invention in an advantageous manner. To this end, reference should be made to the description of the preferred embodiments of the invention. In conjunction with the description of preferred embodiments of the invention with reference to the drawing, also generally preferred embodiments of the teaching will be described. In the drawing.

DETAILED DESCRIPTION OF THE PREFERRED EMBODIMENTS

Figure 1:
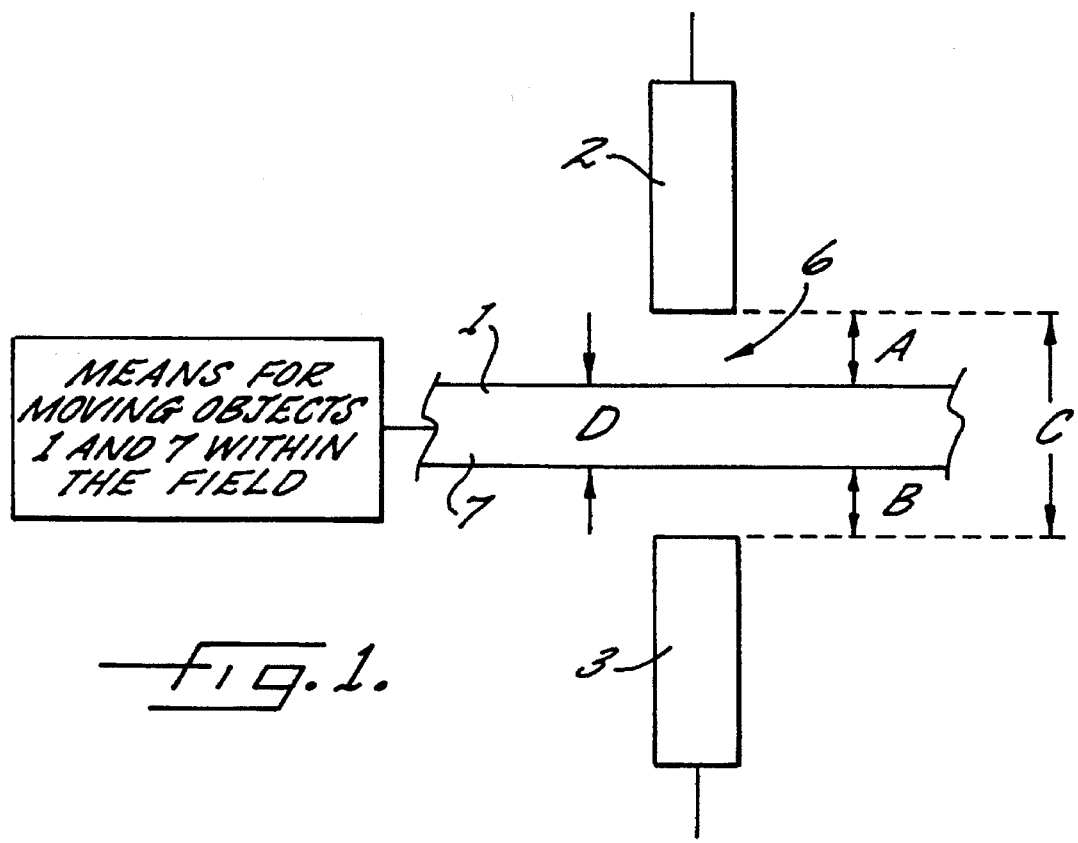
FIG. 1 is a schematic view of a principle of measuring thicknesses, with the arrangement of the sensors representing a first embodiment of the thickness measuring device in accordance with the invention.

FIG. 1 illustrates a measuring principle of a device for measuring the thickness or monitoring tapes 1. Arranged on both sides of tape 1 which is to be monitored with respect to its thickness D, are two noncontacting displacement measuring sensors 2, 3. These displacement measuring sensors 2, 3 face each other in the embodiment selected in FIG. 1. Likewise, the displacement measuring sensors 2, 3 may be arranged side by side, in particular when measuring the thickness of layers of insulating materials 4 on a conducting material, as is shown in FIG. 2.

The thickness measuring device of the present invention is provided with a means for automatically feeding a reference object into the measuring field 6 of displacement measuring sensors 2, 3. This means may, for example, be a transport device which also advances the tape 1 to be monitored. Likewise, it would be possible to provide therefor a separate means.

Figure 2:
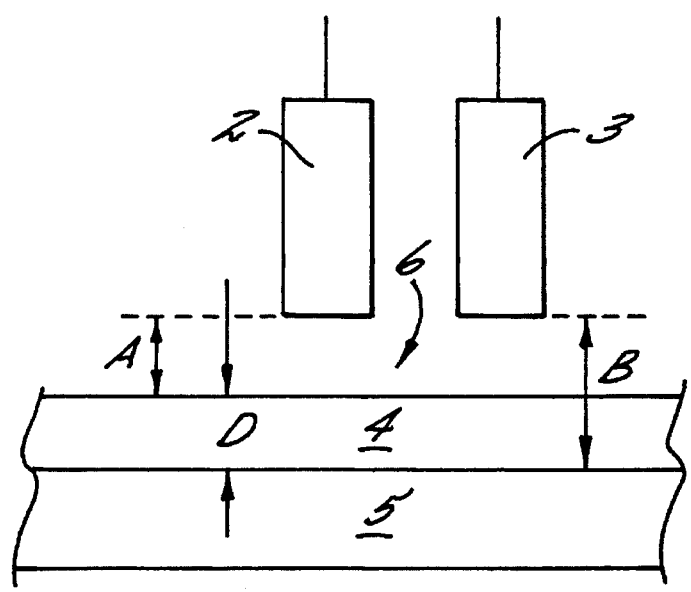
FIG. 2 is a schematic view of a further principle of measuring thicknesses, with the arrangement of the sensors representing a second embodiment of a thickness measuring device in accordance with the invention.

FIG. 2 shows by the example of measuring the layer thickness of insulating materials 4 on a conducting material 5 that displacement measuring sensors 2, 3 can also be arranged side by side. In such an instance, the layer thickness is measured by a combined sensing technique. This, because on the one hand the displacement measuring sensors 2, 3 are a capacitive displacement measuring sensor 2, and on the other hand a displacement measuring sensor 3 operating by the eddy-current principle. The displacement measuring sensor 3 operating by the eddy-current principle measures through the insulating material 4 against the surface of the electrically conducting material 5. The capacitive displacement measuring sensor 2, however, measures against the insulating material 4, since the capacitance of this sensor is influenced by the insulating material 4 acting as a dielectric. The layer thickness D results then from the difference of the two measured distances A, B.

To calibrate a thickness measuring device operating by the principle shown in FIG. 1, it is necessary to have available a reference object 7 with a known thickness $D_{ref}$. In the instance of tape 1 shown in FIGS. 1 and 2, this tape could likewise be the reference object 7. Therefore, the Figures of the description are provided both with the numeral of tape 1 and with the numeral of reference object 7. The distances A, B measured by displacement sensors 2, 3 and the distance C between the displacement sensors 2, 3 allow to compute a correcting value K (A, B). A is a linear function of B, and vice versa, so that for the function K (A, B) it is also possible to use K (A) or K (B). In other words, this means that the measuring error occurring as a result of the nonlinearities of displacement measuring sensors 2, 3 can be corrected as a function of the measuring error of only one of the displacement measuring sensors 2 or 3.

The movement of the reference object 7 having the thickness $D_{ref}$ between the displacement measuring sensors 2, 3 and parallel to their active surfaces (i.e., by parallel displacement) allows to pick up the continuous function K (A) or K (B), which reflects the nonlinearities of both displacement measuring devices 2, 3. By addition, this function compensates for the nonlinearities of the thickness measuring device, as follows:

$D_{ref}$=C−(A+B)+ correcting value (A, B). In accordance with the invention, this method can also be applied to the thickness measurement of several objects having different thicknesses. To this end, a correcting function K is computed, which is dependent on A or B and a variable reference thickness $D_{ref}$. This correcting function $$K (A, D_{ref}) \text{ or } K (B, D_{ref})$$

can be transformed with $D_{ref} \approx C-(A+B)$ by approximation to K' (A, B).

The thickness of the unknown measuring object results then from $$D=C-(A+B)+K' (A, B),$$

whereat K' is by approximation dependent only on A or on B. With the aid of the two-dimensional function K' (A, B), it is possible to perform essentially more accurate thickness measurements, since the nonlinearities of the two displacement measuring sensors 2, 3 can be compensated by K' (A, B).

Figure 3:
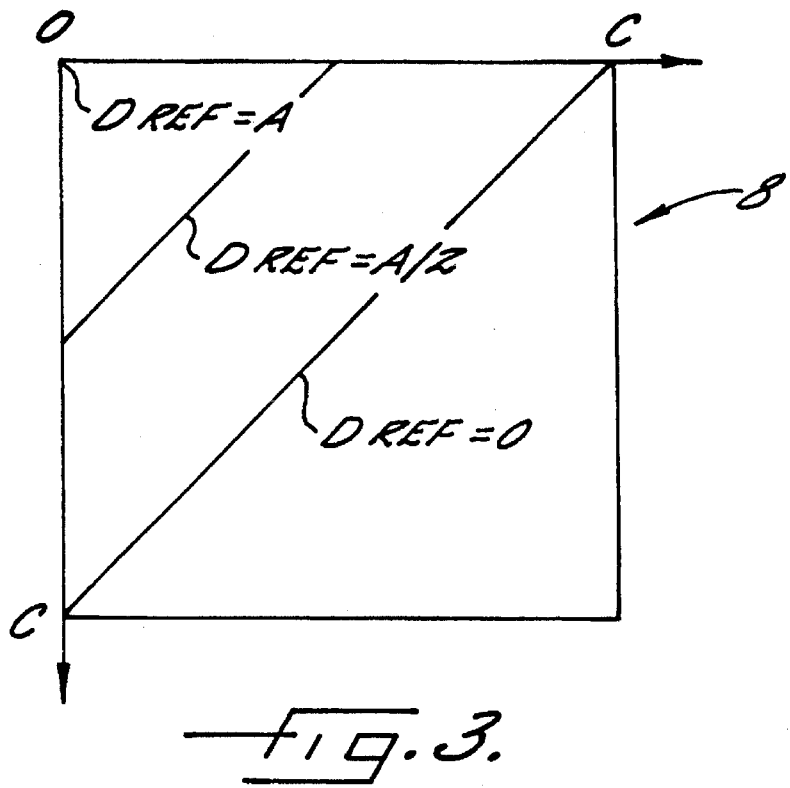
FIG. 3 is a schematic view of the addressing of a matrix memory for inputting the measuring errors or correcting values necessary for compensation in the case of three reference thicknesses.
Figure 4:
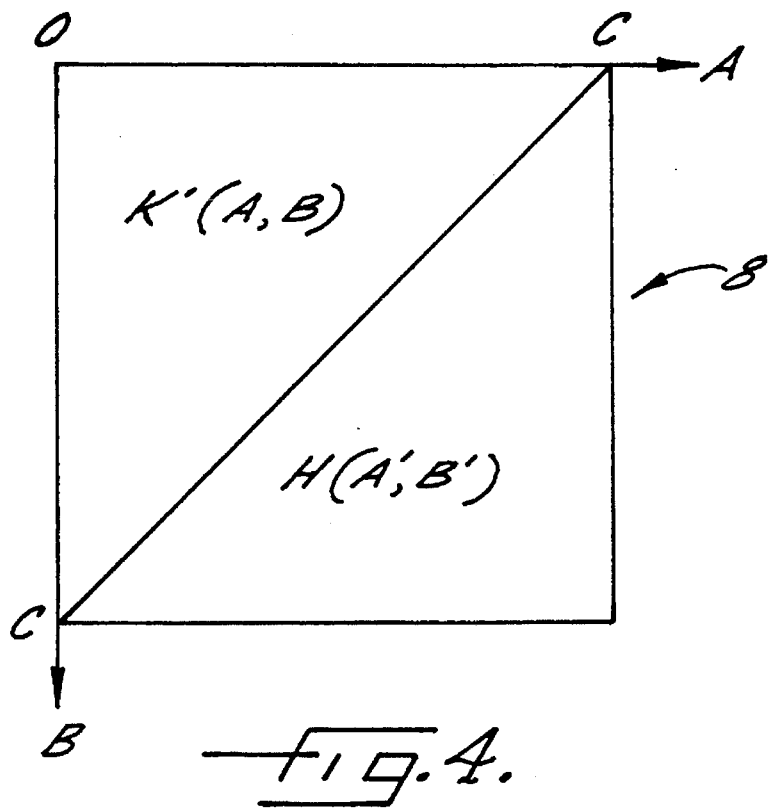
FIG. 4 is a schematic view of the occupation of the matrix, with both correcting values and pertinent frequency values being input.

In a preferred manner, the correcting values necessary to compensate for the measuring errors caused by the nonlinearity of displacement measuring sensors 2, 3 can be input in digital form in a memory 8. This memory 8 may be organized two-dimensionally. The addressing of such a matrix memory could be laid out, in the instance of three different reference thicknesses ($D_{ref}=0$, C/2, C), in accordance with the illustration of FIG. 3.

When storing the correcting values K in digital form, it will be necessary to quantize the correction family of characteristics in space coordinates. The array of correcting values can be represented accordingly in a triangular matrix. When different thicknesses of reference objects are taken into account, the thickness of the reference object is added as a third dimension, with a linearization occurring between the different thicknesses or respectively between the measuring errors at different thicknesses.

The correcting values K which variously result in the linearization by the deflection of the reference object, can be used to average the correcting value of an interval or respectively a quantizing stage. However, this also requires a storage of the frequency of measured values within a quantization interval. The occupation may occur according to the illustration of FIG. 1, with H (A', B') being the frequency values and k" (A, B) the correcting values.

The correcting values are then computed as follows:

$$K'(A, B) = D_{ref} - C + A + B \text{ for } H(A', B) = 0$$

$$= K'(A, B) - \frac{K'(A, B)}{H(A', B')} + \frac{(D_{ref} - C + A + B)}{H(A', B')}$$

$$\text{for } H(A', B') > 0$$

$$H(A', B') = H(A', B') + 1$$

Measured values which are still "missing" after the linearization of the thickness, i.e., matrix spaces with H (A' B')=0 may be filled by a two-dimensional interpolation method. Thus, the linearization allows to also improve measurements on objects, whose thickness has not yet been linearized as reference thickness. This applies in particular, when the thicknesses of these objects lie between thicknesses of objects already used a reference thicknesses for the linearization. The interpolation may occur, for example, with a two-dimensional average filter known from image processing.

We claim:

1. A method of calibrating a thickness measuring device having at least two noncontacting displacement measuring sensors (2, 3) forming a measuring field, and which is adapted to compensate for the non-linear behavior within the measuring range of the measuring sensors and also for the variable position of the object to be measured within the measuring field, and comprising the steps of moving a reference object (7) with a predetermined known thickness ($D_{ref}$) within the measuring field (6) of the displacement measuring sensors (2, 3,);

measuring the distances (A, B) between the respective displacement measuring sensors (2, 3) and the reference object (7) at each of a plurality of relative positions of the reference object (7) toward and away from the sensors within the measuring field;

determining any measuring error of the thickness measuring device based upon the actual measurements obtained from the displacement sensors (2, 3) and the known thickness of the reference object (7) at each of the relative positions toward and away from the sensors; and storing the determined measuring error for each of the relative positions so as to permit the thickness measurement of an object which is moved through the measuring field and is susceptible to fluttering toward and away from the sensors, to be corrected for non-linearities of the displacement measuring sensors (2, 3) and for the variable position of the object based upon the measuring error determined for the respective relative position of the object.

2. The method as defined in claim 1 wherein the sensors have parallel reference surfaces and the step of moving the reference object (7) within the measuring field (6) includes moving the reference object toward and away from the parallel reference surfaces.

3. The method as defined in claim 1 wherein the sensors have parallel reference surfaces and the step of moving the reference object (7) within the measuring field (6) includes moving the reference object in a direction parallel to the parallel reference surfaces.

4. The method as defined in claim 1 comprising the further step of selecting the reference object (7) from a magazine containing several reference objects with different thicknesses (Drew) prior to the step of moving a reference object within the measuring field.

5. The method as defined in claim 1 comprising the further step of repeating the calibrating method in predetermined time intervals, so that the displacement measuring sensors constantly adapt to environmental influences.

6. An apparatus for measuring the thickness of an object and which is characterized by the ability to be accurately calibrated to compensate for the non-linear behavior within the measuring range of the measuring sensors and also for the variable position of the object to be measured within the measuring field, and comprising at least two non-contacting displacement measuring sensors (2, 3) forming a measuring field;

means for moving a reference object (7) with a predetermined known thickness ($D_{ref}$) within the measuring field (6) of the displacement measuring sensors (2, 3) and so that the distances (A, B) between the respective displacement measuring sensors (2, 3) and the reference object (7) at each of a plurality of relative positions of the reference object (7) toward and away from the sensors within the measuring field may be measured;

means for determining any measuring error of the apparatus based upon the distances (A, B) measured by the displacement measuring sensors (2, 3) and the known thickness of the reference object (7) at each of the relative positions toward and away from the sensors; and means for storing in a data storage (8) any measuring error of the apparatus determined at each of the relative positions, and so as to permit the thickness measurement of an object which is moved through the measuring field and is susceptible to fluttering toward and away from the sensors, to be corrected for non-linearities of the displacement measuring sensors (2, 3) and for the variable position of the object based upon the stored measuring error for the respective relative position of the object.

7. The apparatus as defined in claim 6 wherein the sensors have parallel reference surfaces and are arranged in opposing relationship.

8. The apparatus as defined in claim 6 wherein the sensors have parallel reference surfaces and are arranged side by side, with one of said sensors operating capacitively or optically, and the other of said sensors operating by the eddy-current principle.

9. The apparatus as defined in claim 6 wherein the error storing means acts to input each error signal into said data storage (8) in digital form.

10. The apparatus as defined in claim 9 where said data storage (8) is organized two dimensionally.

11. The apparatus as defined in claim 9 wherein said data storage (8) is organized three dimensionally so as to permit measuring objects of different thicknesses to be utilized.

12. A method of calibrating and utilizing a thickness measuring device having at least two noncontacting displacement measuring sensors (2, 3) forming a measuring field, and which is adapted to compensate for the non-linear behavior within the measuring range of the measuring sensors and also for the variable position of the object to be measured within the measuring field, and comprising the steps of moving a reference object (7) with a predetermined known thickness ($D_{ref}$) within the measuring field (6) of the displacement measuring sensors (2, 3,);

measuring the distances (A, B) between the respective displacement measuring sensors (2, 3) and the reference object (7) at each of a plurality of relative positions of the reference object (7) toward and away from the sensors within the measuring field;

determining any measuring error of the thickness measuring device based upon the actual measurements obtained from the displacement sensors (2, 3) and the known thickness of the reference object (7) at each of the relative positions toward and away from the sensors;

storing the determined measuring error for each of the relative positions;

moving an object (1) to be measured through the measuring field and so that the object (1) is free to flutter toward and away from the sensors; and measuring the distances (A, B) between the respective displacement measuring sensors (2, 3) and the object (1) to be measured and determining the measured thickness of the object (1) based upon the measured distances (A, B) while correcting the measured thickness with the stored measuring error associated with the relative position of the object (1) so as to produce a corrected thickness output.

* * * * *